2 Sheets—Sheet 1.

D. McPHERSON.
Grain Binder.

No. 236,347. Patented Jan. 4, 1881.

Witnesses:
M. H. Brooker
John Mitchell

Inventor:
D. McPherson
By Frank H. Clement
Atty.

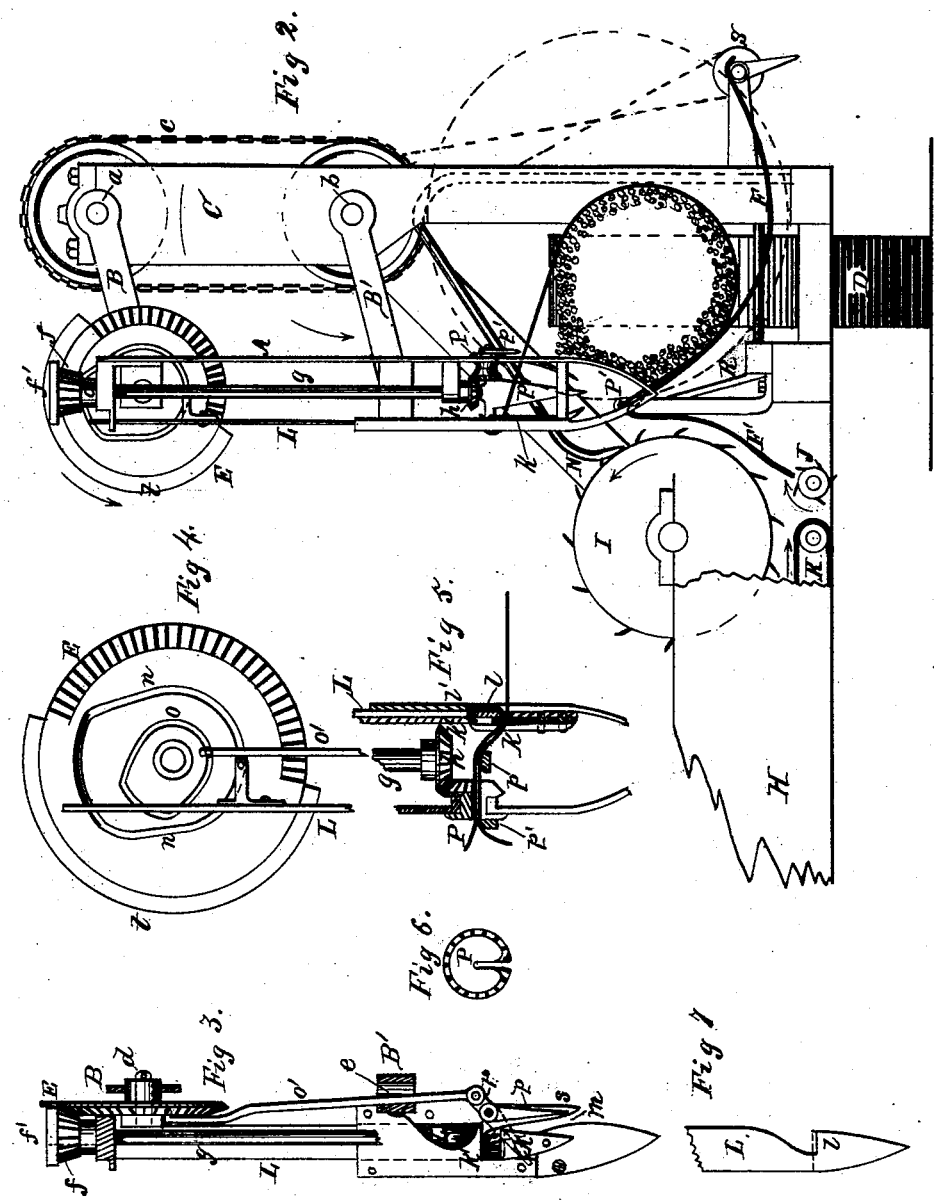

UNITED STATES PATENT OFFICE.

DANIEL McPHERSON, OF CALEDONIA, NEW YORK.

GRAIN-BINDER.

SPECIFICATION forming part of Letters Patent No. 236,347, dated January 4, 1881.

Application filed December 17, 1878.

*To all whom it may concern:*

Be it known that I, DANIEL MCPHERSON, of Caledonia, in the county of Livingston and State of New York, have invented certain Improvements in Grain-Binders, of which the following is a clear and accurate description, reference being had to the accompanying drawings, in which—

Figure 1:
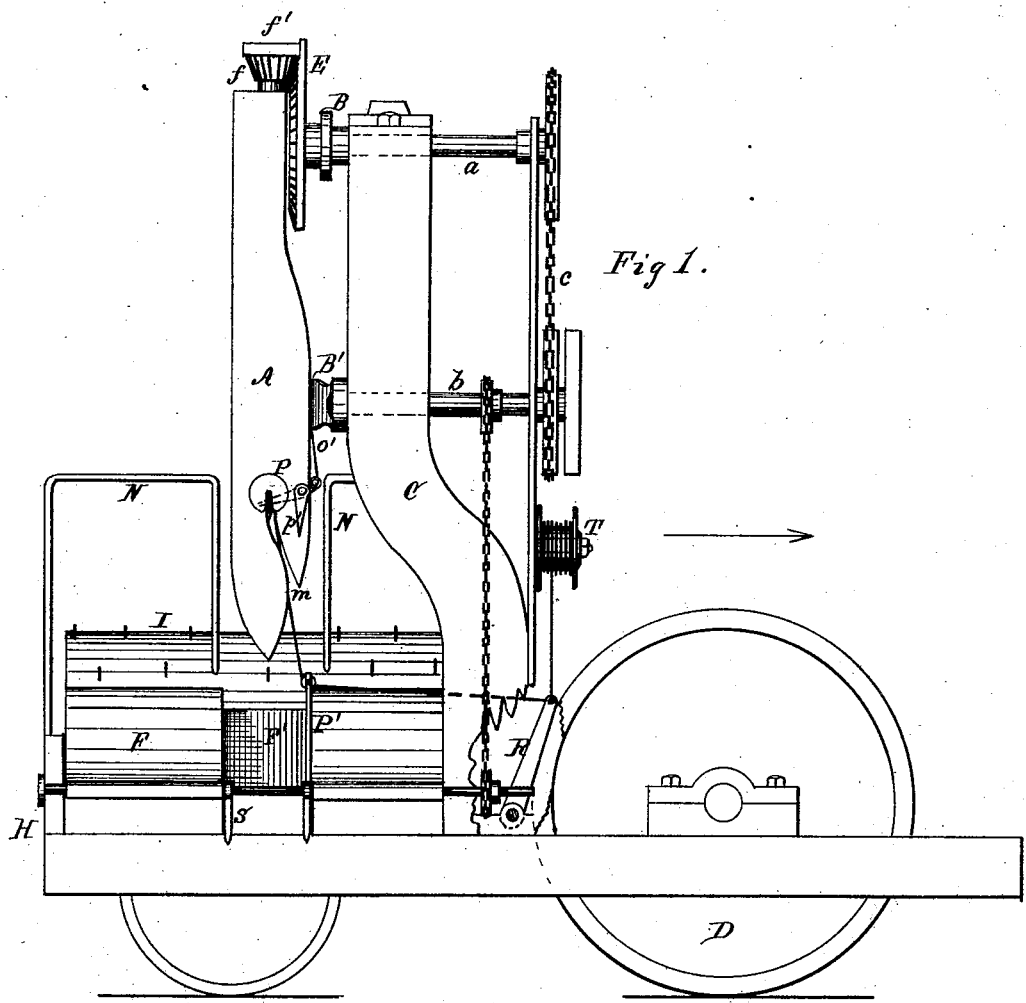

Figure 1 is an end elevation of a harvester with my binder attached. Fig. 2 is a rear elevation of the same. Fig. 3 is a vertical section of the binder-arm. Figs. 4, 5, 6, 7, and 8 show details.

My invention relates to that class of grain-binders which use soft-iron wire for bands; and it consists, mainly, in the embodiment in the binding-arm of the entire twisting and cutting mechanism, and in suspending and operating the same from two crank-arms revolved simultaneously; and it further consists in various devices for performing the several operations involved in the foregoing.

In my improved binder the wire is supplied from a point near the gavel-receiver, and the entire binding, twisting, and cutting operations are performed by the binder-arm, which contains suitable mechanism and a motive shaft therefor; and the manner of its suspension and its motion peculiarly adapts it to its office.

H is the harvester-platform, provided with the endless apron K, as heretofore in common use.

I is an elevating-roller, having teeth or longitudinal slats on its face, and operating to transfer the grain from the apron K to the gavel-receiver F. F' is an extension of the latter, forming a concave, upon which the grain is moved by the roller I. An auxiliary roller, J, is located so as to prevent clogging in the angular space between the apron, the roller, and the incline. The direction of motion of these parts is indicated by arrows in Fig. 2.

D is the ground or driving-wheel of the harvester, and motion may be conveyed therefrom to the above parts in any suitable manner.

A is the binding-arm, which is a hollow box, preferably square in cross-section, and pointed at the lower end, so as to enter the grain easily. B and B' are crank-arms rigidly secured to the ends of shafts $a$ and $b$, which have bearings in the upright frame or post C, attached to the harvester. These shafts may be driven by suitable gearing or chains from the drive-wheel D, and they are made to revolve simultaneously by means of chain-wheels and chains $c$, or other equivalent devices.

E is a segmental or mutilated gear, rigidly secured to the outer end of the crank B and journaled upon the stud $d$, attached to the binding-arm near the upper end. Crank B' is journaled upon a similar stud, $e$, Fig. 3, at a distance from $d$ equal to the distance apart of the shafts $a$ and $b$. It will be observed that when the latter are revolved the binding-arm always retains a vertical position, its point moving in the circle indicated in dotted lines in Fig. 2, and that during one such complete movement the gear E revolves with reference to it once.

A shaft, $g$, in the binder-arm is operated by the gear E through pinion $f$, and, in turn, operates the twister P by gear $h$. The twister is a slotted circular plate rigidly attached to its gear, which has a bearing in one side of the binder-arm, its construction being clearly shown in Figs. 5 and 6. The slot for receiving the wire is cut also through the gear at the bottom of one of the teeth, so that the twisting is done at the center of the plate. In the opposite wall of the binder-arm, and in a line with the twister, I locate the cutting and clamping jaws $l$ $k$ $l'$ $k'$, and a slot, $m$, is provided, leading from near the point of the binder-arm to the cutter and twister, into which the wire must pass during the movement of the arm.

The cutter $k$ and jaw $l$ are attached to a sliding bar, L, which extends upward parallel with the shaft $g$, and is operated by a cam, $n$, Fig. 4, on the face of the gear E. This cam is so timed with reference to the segment of the gear that it moves the cutter $k$ downward and opens the clamping-jaw $l$ an instant after the twister begins its revolution. Another cam, $o$, on the face of the gear E operates the fingers $p$ $p'$ through the link $o'$ and arm $r$. The finger $p$ forces the wire, as it is drawn into the slot $m$, into the cutting-jaw, as shown in dotted lines in Fig. 3, and $p'$ operates similarly with reference to the twister, so as to insure the reception of the wire by the twister and by the clamping and cutting devices. These fingers when not in operation are forced down by the cam so that they are in line with the stationary lips s, as shown in Fig. 3, and consequently enter the grain without difficulty.

Figure 8:
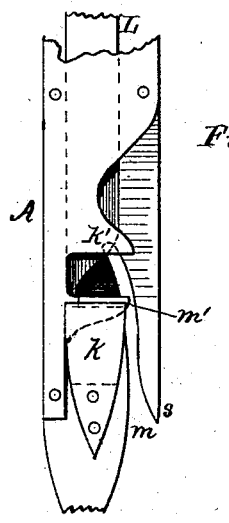

The movable bar L is notched in, as indicated in Fig. 7, to form the griping-jaw l, and the knife k is secured thereto at a sufficient distance from its face to admit the lip m' between them. The lip m' is formed with or rigidly attached to the stationary cutting-jaw k', as shown in Fig. 8; and it will be seen that as the bar L moves downward the lip m' pushes out any short ends of wire, straw, or grain-kernels that may be lodged in the movable jaw l k. For the purpose of clearing the stationary jaw, the notch in the bar L is so located that in the descent of the latter the inclined edge of the notch acts to force out anything that may be caught in the apex of the slot m. In this manner these parts are all self-clearing.

N, Figs. 1 and 2, are dividing-fingers, fastened to the frame of the machine and resting at one end upon the periphery of the roller I, as shown in Fig. 2, so as to clear it from grain and at the same time guide the latter into the receiver F. These clearers are so arranged that they lie within the upper portion of the circle described by the binding-arm, but allow sufficient grain to gather under them in the receiver for a bundle.

P' is the wire-guide, which is provided with rollers or other anti-friction devices, so as to permit the wire to travel through readily. This guide is located quite near the track of the binder-arm, so that the wire proceeding from it around the bundle shall pass into the slot m, as before mentioned.

In the passage of the wire from the spool T, Fig. 1, it is threaded through the take-up arm R, which has an oscillating movement upon its sustaining rock-shaft, imparted in any suitable manner from the other parts of the binder. This movement is properly timed with relation to that of the binder-arm so as to take up the unused wire carried out by the latter in its motion around or over the gavel, insuring an equal amount of tension on bundles of different size.

S is a revolving bundle-discharger, moving simultaneously with the shafts a and b, and provided with fingers so adjusted that they rise above the outer edge of the receiver just as the binding-arm has finished its work, and thrusts the bundle off the machine. This device is desirable from the fact that very often the straw is so entangled that several bundles cling together, and occasionally the twisted end of the band hangs in the binding-arm.

It may be well to remark, before describing the operation of my binder, that the mutilated gear E is provided with a projecting flange, t, extending around that part of its periphery not provided with teeth, and the pinion f has a projecting lug, f', one side of which is flattened to bear against the flange t, as described in my patent of March 5, 1878, No. 200,868.

The operation of my improved binder is as follows:

First, to thread the wire, the latter is passed from the spool through the take-up arm R and the guide P', and drawn into the slot m of the binder-arm. The cranks B B' are then given part of a revolution, so as to bring the segment of the gear E into operation, and also the cam n, by which latter the bar L is lifted, the wire is caught, kinked, and held securely in the jaws l, l', and k', and cut off by the knife k, the loose end dropping out of the slot m. The binder-arm then passes on ready to bind the bundle.

Second, to bind a bundle, the grain, having been conveyed to roller I and elevated into the receiver F, lies in the latter over the wire, which has been previously carried downward by the binder-arm in the lower part of its movement. The latter then carries the wire over the gavel, and passing down close to the guide P', receives the wire a second time into the slot m, as indicated in Fig. 5, that part of the wire which is around the bundle having previously passed into the slot as the binder-arm traversed the gavel. During this movement the arm R has made an oscillation, taking up the slack or unused wire carried out by the binding-arm, and producing upon the band whatever tension there may be upon the spool T. As soon as both ends of the band are received into the slot m the cam o throws up the fingers p p', forcing the wire to the center of the twister. Thereupon the segment of the gear E begins to move the latter, and during or immediately after its first revolution, the cam n opens the jaws l l', releasing the clamped ends of the band. If this movement is made too soon, the tension will draw the wire out of the twister; if too late, there is danger that it will be broken by the operation of twisting. At or just before the completion of the twist the bar L makes its upward movement, cutting the wires by the shears k k', and clamping the end extending from the guide P' at the same instant in the jaws l l'. By this time the fingers p p' have dropped down and the binder-arm has arrived at the rear edge of the receiver, just over the discharger S, the fingers of which push the bundle off the machine. The position of the wire just at the instant the twisting begins is shown in Fig. 5.

It will be observed that by the peculiar arrangement of the binding apparatus at the rear of the drive-wheel space is utilized, and the combined machine is much reduced in width and bulk, the power required to elevate the grain over the wheel is saved, and the first cost of the apparatus much reduced.

I do not intend to confine myself to the form of twister shown herein, as there are many other varieties that would operate equally well when adapted to my device.

It is plain, also, that the self-contained binding-arm is applicable to any form of harvester in which the grain is delivered into a receiver, and especially to that form known as the "Marsh" harvester; and it is equally obvious that said binding-arm and the means of operating it, as well as the gavel-receiver and elevator I, may be used, in substantially the form shown, in a machine using cord for bands; and I do not intend to confine myself exclusively to the use of wire with those parts.

In practice it will be necessary to protect the moving parts contained in the binding-arm by casing the open sides and allowing nothing to enter except through the slot m. In the drawings these casings or shields are omitted, for the purpose of showing the construction of the parts.

What I claim as my invention is—

1. In a grain-binder, a needle or wire-carrying arm, in combination with mechanism for twisting or tying the band and two simultaneously-revolving cranks rotating in the same direction and having a fixed pivotal connection with said band-carrying arm for supporting and operating the same, substantially as described.

2. The combination, in a grain-binder, of a binding-arm, mechanism for twisting or tying the band carried by said arm, and two simultaneously-revolving cranks moving in the same direction, supporting and operating said arm, substantially as and for the purpose set forth.

3. The combination, in a grain-binder, of a gavel-receiver, a binding-arm containing mechanism for twisting or tying the band, two simultaneously-revolving cranks for carrying said arm, and a gear rigidly attached to one of the cranks for operating the twisting mechanism, substantially as set forth.

4. The combination, in a grain-binder, of a binding-arm, two revolving cranks rotating in the same direction, carrying said arm and having a fixed pivotal connection therewith, and suitable gearing for insuring the simultaneous and positive movement of the cranks.

5. The combination, in a grain-binder, of a gavel-receiver, a binding-arm, two simultaneously-revolving cranks carrying said arm, a wire-cutter arranged in or upon the binding-arm, and a cam for operating the same, rigidly attached to the extremity of one of the cranks, substantially as and for the purposes set forth.

6. In a grain-binder, the receptacle, in combination with the needle, given an orbital movement and retained in any desired direction by the chains and sprocket-wheels, or their equivalents, substantially as described.

7. The needle fixed to the non-rotating wrist and containing the mechanism for completing the operation of binding, the said parts being given their respective movements by gearing and cams fixed upon the outward extremity of the crank and revolving around the said wrist, substantially as described.

8. In combination with the binding-arm A and crank B, the reciprocating bar L, provided with a wire-cutter, k, and clamping-jaw l, and the cam n, for operating the same, rigidly attached to the extremity of the crank B, operating substantially as described.

DANIEL McPHERSON.

Witnesses:
FRANK H. CLEMENT,
WM. A. MONTGOMERY.